Fig. 1.

Oct. 2, 1951 — J. W. ELLOR — 2,569,981

AUTOMATIC TRANSMISSION MECHANISM

Filed May 15, 1948 — 6 Sheets-Sheet 2

INVENTOR
JOSEPH W. ELLOR.

ATTORNEY

Oct. 2, 1951  J. W. ELLOR  2,569,981
AUTOMATIC TRANSMISSION MECHANISM
Filed May 15, 1948  6 Sheets-Sheet 4

INVENTOR
JOSEPH W. ELLOR
ATTORNEY

Oct. 2, 1951  J. W. ELLOR  2,569,981
AUTOMATIC TRANSMISSION MECHANISM
Filed May 15, 1948  6 Sheets-Sheet 6

Fig. 11. NEUTRAL POSITION — MOTOR IDLING

Fig. 12. SHIFTING TO FORWARD POSITION
BRAKE ON MOMENTARILY DURING SHIFTING & THEN OFF AGAIN
INPUT INTERMEDIATE TORQUE CONTROL GEAR
OUTPUT INTERMEDIATE TORQUE CONTROL GEAR
PRESSURE REGULATING VALVE OPEN UNDER SMALL PRESSURE, CLOSES UNDER GREATER PRESSURE BEFORE EFFECT IS NOTED ON GEARING.

Fig. 13. FORWARD DIRECT DRIVE
RING GEAR 60 ROTATES FREE
BRAKE OFF
HOUSING ROTATES

Fig. 14. FORWARD & DEPRESSING HILL GEAR PEDAL
RING GEAR 60 HELD STATIONARY

Fig. 15. REVERSE POSITION
BRAKE ON

DIAGRAMS OF THE PLANETARY GEARING IN VARIOUS OPERATING STAGES.

INVENTOR
JOSEPH W. ELLOR.
BY
ATTORNEY

Patented Oct. 2, 1951

2,569,981

UNITED STATES PATENT OFFICE 2,569,981

AUTOMATIC TRANSMISSION MECHANISM

Joseph William Ellor, East Orange, N. J.

Application May 15, 1948, Serial No. 27,248

7 Claims. (Cl. 74—752)

The present invention relates to power transmissions and more particularly to an automatic transmission for power driven vehicles or motor boats and the like.

Automatic transmissions are at present used to a limited extent in some types of vehicles but such systems are restricted in speed variations which thus limits the power transmitted from the engine to the drive shaft. A further disadvantage inherent in present type automatic transmissions resides in the fact that the vehicle must not only be brought to a complete stop before shifting of the transmission mechanism into reverse but such shifting is itself accompanied by a clashing of gears. This is not only exceedingly annoying to the operator but causes injury and shortening of the life of the transmission gearing.

It is accordingly the primary object of the present invention to provide an automatically operable transmission wherein the power ratio and speed varies automatically in direct response to existing conditions such as the speed of the vehicle and rotation of the driving motor.

Another object of the present invention is the provision of an automatic transmission wherein operation of the transmission is responsive to the speed of the vehicle and rotation of the power source and the shifting of the transmission gearing is silent at all speeds and automatic.

Another object of the present invention is the provision of an automatic transmission which is not only silent in its automatic operation in response to variations in speed of the vehicle and rotation of the motor, but wherein the transmission may be operated to reverse position without the necessity of bringing the vehicle to a complete stop thus enabling the transmission to momentarily function as a brake before reversal of the direction of movement of the vehicle.

A further object of the present invention is the provision of an automatic transmission wherein hydraulic pressure accumulators are employed which automatically varies the torque applied to the vehicle drive gear in response to variations in speed of the vehicle and the motor.

Still further objects of the present invention will become obvious to those skilled in the art by reference to the accompanying drawings wherein.

Figure 1:
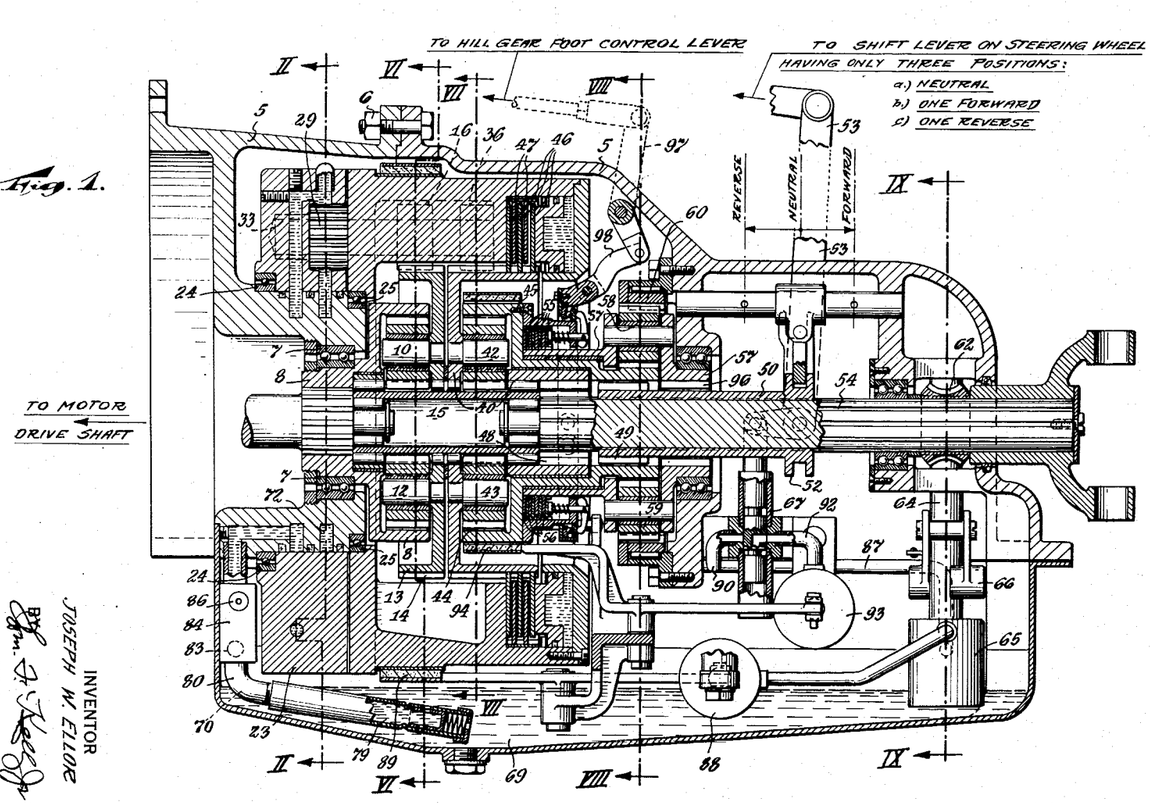
Fig. 1 is a cross-sectional view of the transmission of the present invention.
Figure 6:
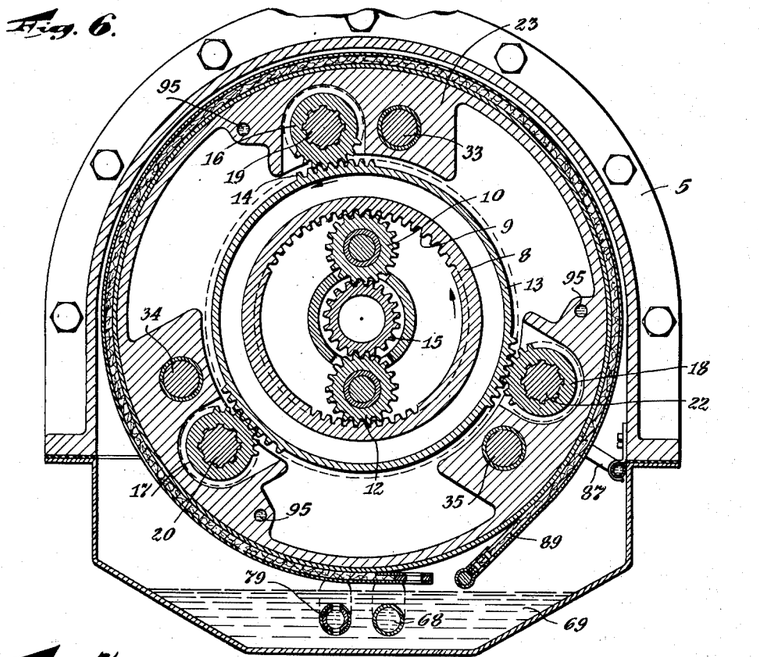
Fig. 6 is a sectional view taken on the line VI—VI of Fig. 1.

Referring now to the drawings in detail, the transmission of the present invention is contained within a two-part housing 5 bolted together at 6. Suitably journalled in ball bearings 7 carried by the housing is an input drive gear 8 which is in the form of a flange with gear teeth 9 (see Fig. 6) cut on the inner peripheral surface of the flange. Meshing with the drive gear 8 are a pair of pinion gears 10 and 12 having their axes of rotation disposed 180° apart, with these pinion gears being journalled to and carried by an intermediate variable torque transfer gear 13 also of flange shape and provided with teeth 14 on its outer peripheral flanged surface, with such transfer gear 13 being journalled to rotate about an intermediate variable torque transfer equalizer gear 15 coaxially disposed with, and immediately in back of, the input drive gear 8, as can be more readily seen in Fig. 6.

A plurality of pinion gears 16, 17 and 18 (Fig. 6), with their axes of rotation spaced approximately 120° apart, engage the teeth 14 on the outer periphery of the transfer gear 13. As can be seen more clearly from Figs. 2 and 3, these gears 16, 17 and 18 are carried by respective shafts 19, 20 and 22 which are journalled in a head 23, the latter being itself journalled for rotation, as hereinafter described, about ball bearings 24 and 25. Each shaft 19, 20 and 22 also carries a second pinion gear 26, 27 and 28, respectively (Fig. 2), each of which engages a pinion gear 29, 30 and 32 carried by shafts 33, 34 and 35 journalled in the head 23 in the same manner as the shafts 19, 20 and 22.

Figure 2:
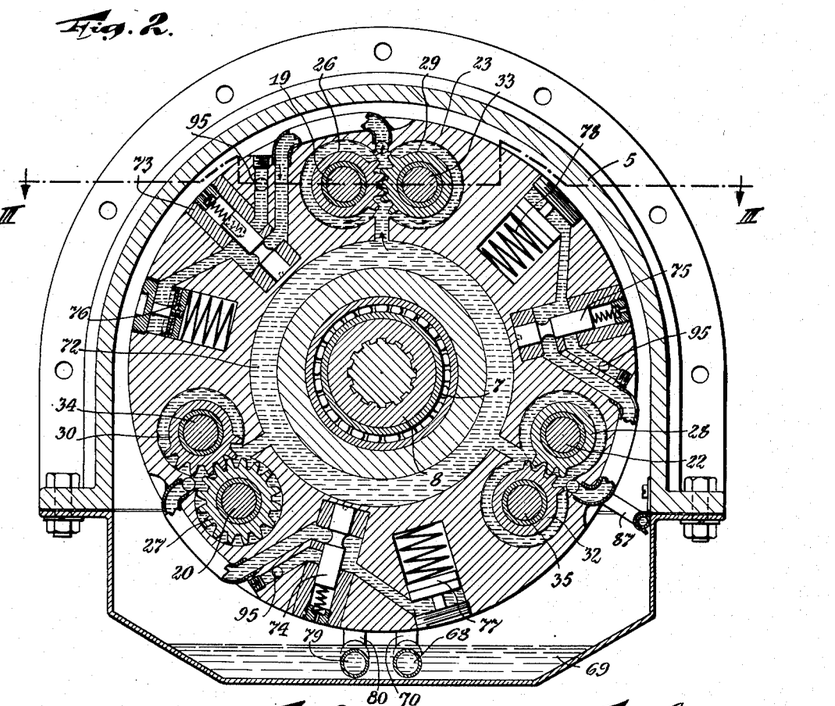
Fig. 2 is a cross-sectional view taken on the line II—II of Fig. 1.
Figure 3:
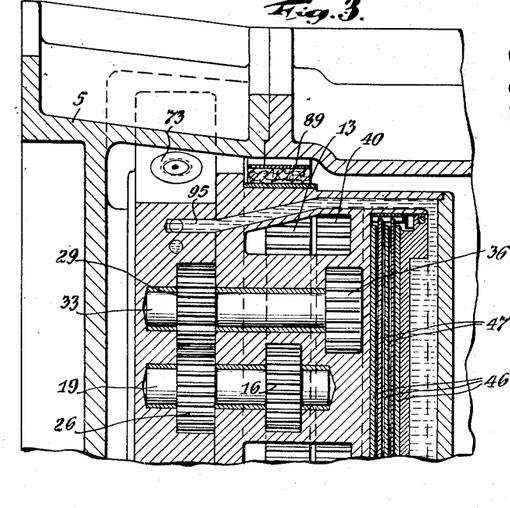
Fig. 3 is a cross-sectional view taken on the line III—III of Fig. 2.
Figure 7:
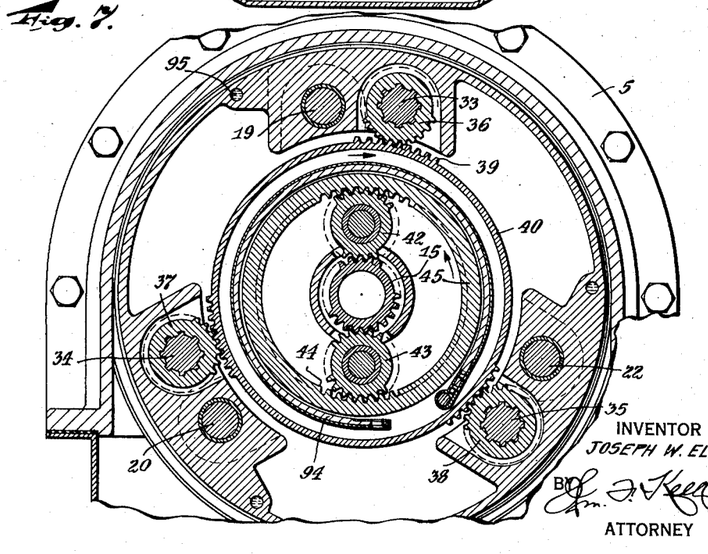
Fig. 7 is a sectional view taken on the line VII—VII of Fig. 1.

Each respective gear set 26—29, 27—30 and 28—32, as shown in Fig. 2, constitute oil-pressure pump units as hereinafter described more in detail, and at the same time operate as transfer gearing, since the shafts 33, 34 and 35 also carry a further pinion gear 36, 37 and 38, respectively, each of which engage the teeth 39 (Fig. 7) on the outer surface of a flanged gear or second intermediate variable torque transfer gear 40, similar to the flanged gear 13, as shown in Fig. 7.

Also, as can be seen more clearly from Figs. 1 and 7, this transfer gear 40 carries a pair of journalled pinion gears 42 and 43 which engage the equalizer gear 15 as well as the teeth 44 disposed on the inner periphery of a flanged output drive gear 45, in the same manner that the pinion gears 10 and 12 engage the teeth 9 of the flanged gear 8 and the equalizer gear 15. Referring again to Fig. 1, it will be noted that the second intermediate variable torque transfer gear 40 carries a series of clutch plates 46 normally disengaged from a similar series of clutch plates 47 carried by the head 23 with the engagement of such clutch plates being hydraulically controlled as hereinafter explained. Also the transfer gear 40, which is in the form of a flange having a hub portion extending beyond the periphery of the flange is provided with teeth 48 (Fig. 1) on the inner periphery of the extending hub portion which is adapted to be engaged by the teeth 49 of a three position manual selector splined coupling 50 operated by a shifting fork 52 and lever 53, for reversing the normal direction of rotation of the output drive shaft 54 which is connected to the selector coupling 50, at the will of the operator.

It will also be noted from Fig. 1 that output drive gear 45 is provided with a series of clutch plates 55 which are normally in engagement with a similar set of clutch plates 56 carried by a forward drive output gear 57, so that under normal operating conditions, except when the "hill gear" as hereinafter explained is in operation, the output drive gear 45 and the forward drive output gear 57 can be considered as one. However, forward drive output gear 57 carries a pair of pinion gears 58 and 59 having their axes of rotation approximately 180° apart which mesh with output drive gear 45 as well as with a ring gear 60, as can be seen from Fig. 8.

Figure 5:
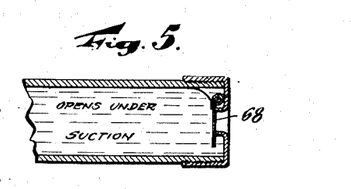
Fig. 5 is a similar view of the sump inlet valve.
Figure 9:
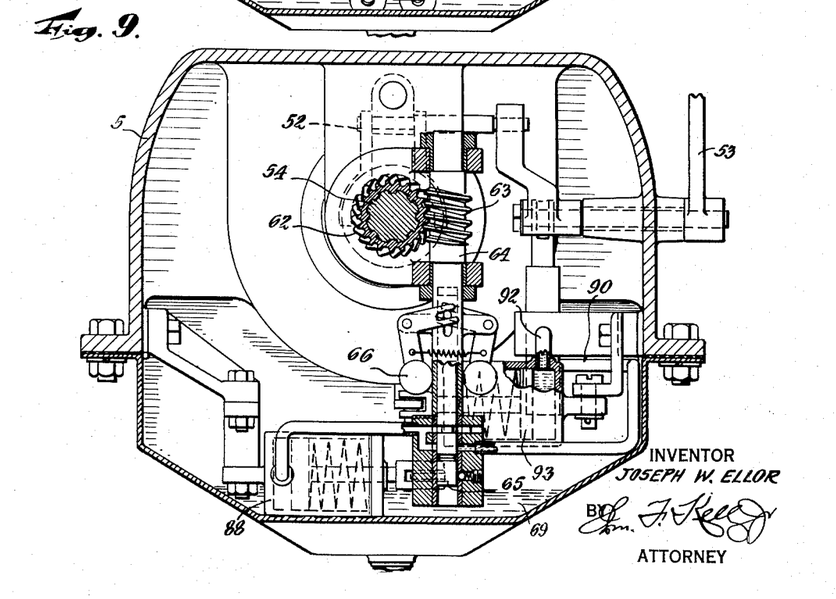
Fig. 9 is a sectional view taken on the line IX—IX of Fig. 1.
Figure 10:
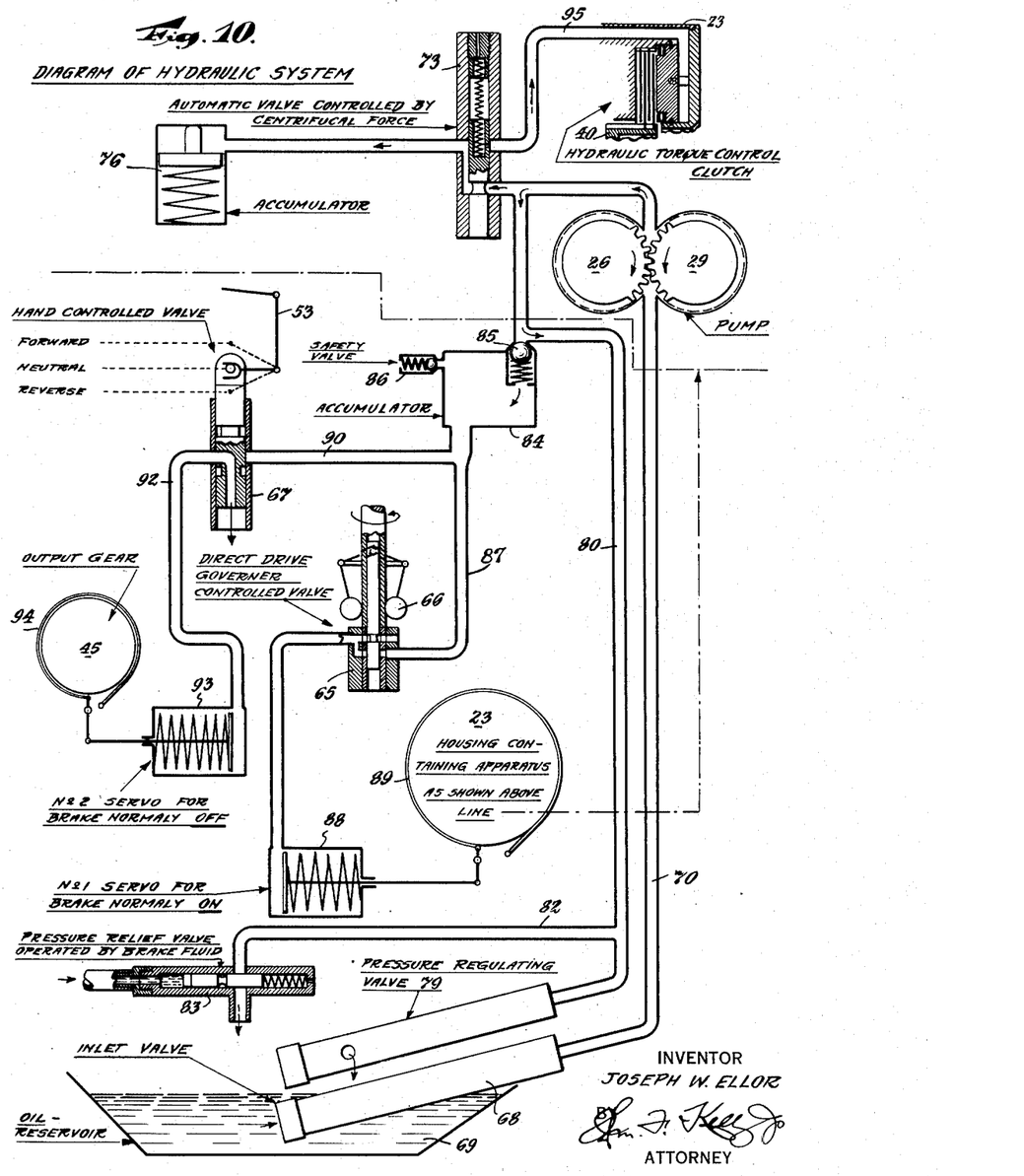
Fig. 10 is a schematic diagram of the fluid pressure system forming an integral part of the present transmission.

A worm gear 62 is carried by the output drive shaft 54 which, as shown in Fig. 9, engages a worm 63 carried by a vertical shaft 64 for the purpose of operating a valve 65 controlled by a governor 66. A second valve 67 (Figs. 1 and 10) is manually controlled by the shifting lever 53 which is thus operated simultaneously with the shifting fork 52 for selecting the direction of motion. By reference to Fig. 2 together with Fig. 10, it will be seen that the hydraulic system comprises an inlet valve 68 (see also Fig. 5) having its open end disposed in the oil sump or reservoir 69 and connected by a conduit 70 (Fig. 10) to an annular passageway 72 (see also Fig. 1) disposed in the head 23. Such passageway 72 interconnects with the respective pump gears 26—29, 27—30 and 28—32, as seen from Figs. 2 and 10, where the fluid is then forced under pressure through a plurality of normally open centrifugal valves 73, 74 and 75, into a plurality of pressure accumulators 76, 77 and 78, carried by the head 23.

Figure 4:
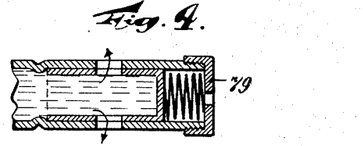
Fig. 4 is an enlarged fragmentary view of the sump outlet valve.

At the same time the fluid under pressure is forced back to a pressure regulating valve 79 (see Fig. 4) through a conduit 80 where it exhausts into the sump or reservoir 69 when the pressure rises too high. Such exhaust conduit 80 also branches through a conduit 82 into a pressure relief valve 83 actuated by the vehicle braking system for suddenly relieving the pressure upon application of the vehicle brakes. A fixed pressure accumulator chamber 84 is provided into which the fluid is forced through a check valve 85 with this chamber 84 having a safety check valve 86. From this accumulator chamber 84 a conduit 87 extends to the governor controlled valve 65 and thence to a servomotor 88, which is mechanically connected to a brake band 89 normally engaging the outer peripheral surface of the head 23 under a spring pressure in the customary manner, to prevent rotation thereof. A similar conduit 90 connects the accumulator chamber 84 to the normally closed manually operable valve 67 and from this latter valve 67 a conduit 92 extends to a second servomotor 93, mechanically connected to a brake band 94 surrounding the outer periphery of output drive gear 45 but normally out of contact therewith since in this instance the customary spring urges the band in the disengaged position. It will also be noted that a conduit 95 extends from each centrifugally operated valve 73, 74 and 75 to one side of the clutch plates 47 to force them into engagement with the clutch plates 46 carried by the transfer gear 40 at the proper time.

Figures 11, 12:
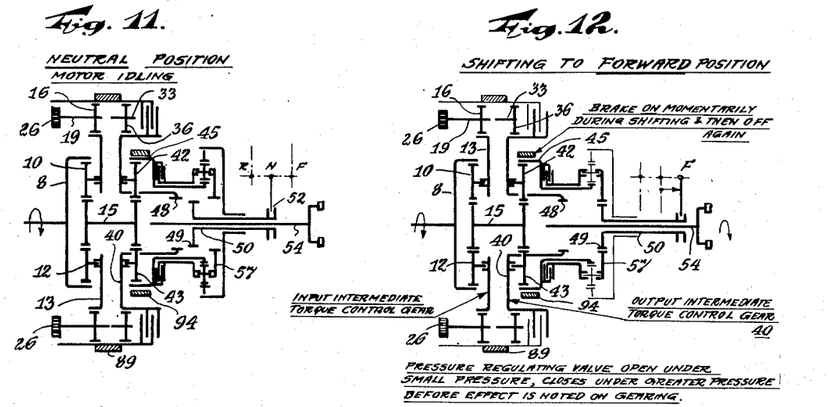
Figs. 11 to 15, inclusive, are schematic illustrations showing various operating positions of the transmission of the present invention.

The transmission of the present invention operates in the following manner: Upon starting of the motor and with the transmission shifting lever 53 in the neutral position input drive gear 8 rotates in a clockwise direction, as shown by the arrow in Fig. 11. Since this gear is the drive gear of a planetary arrangement it causes rotation of the pinion gears 10 and 12. These gears being journalled to the intermediate variable torque transfer gear 13 causes the latter to also rotate, at the same time the equalizer gear 15 rotates in relation to the speed of transfer gear 13, until the latter stops rotating due to the building up of pressure, as hereinafter mentioned, when the torque is transferred to output gear 45 through equalizer gear 15. Pinion gears 16, 17 and 18 being in engagement with transfer gear 13 also rotate and since their respective shafts carry the pump gears 26, 27 and 28 the latter also rotate in the same direction. The remaining engaging gears 29, 30 and 32 of the pumps also rotate but in an opposite direction and carry with them the pinion gears 36, 37 and 38. These latter gears being in mesh with transfer gear 40, forming the driving gear of a second planetary gear arrangement, causes such gear to rotate carrying with it the pinion gears 42 and 43 which likewise causes the equalizer gear 15 to rotate. However, since these pinions 42 and 43 also engage the output drive gear 45 it also rotates and, because of the normal engagement of the clutch plates 55 and 56, the forward drive output gear 57 rotates therewith and its pinion gears 58 and 59 carry the ring gear 60 therewith.

It will be appreciated that at this time with the shifting lever in the neutral position, the governor controlled valve 65 and the manually operable valve 67 are in the closed position. Accordingly, the fluid drawn from the sump or reservoir 69, by the pumps 26—29, 27—30 and 28—32 which are operating, is forced through the normally open centrifugal valves 73, 74 and 75 into the accumulators 76, 77 and 78. At this time no pressure is built up in the stationary accumulator 84 nor the accumulators 76, 77 and 78 because not enough flow is obtained at idling motor speed to close the pressure regulating valve 79. In the neutral position the entire gearing arrangement will be in the relation as shown by the schematic diagram of Fig. 11 with the heavy lines denoting moving parts at this time.

Assuming now it is desired to start the vehicle in the forward direction the operator moves the shifting lever 53 to the right as shown in Fig. 1. This causes the three position manual selector splined coupling 50 to also move to the right and its teeth 49 to silently engage teeth 96 of the forward drive output gear 57, thus causing the output drive shaft 54 to rotate to drive the differential mechanism of a vehicle, or the propeller of a boat. At the time of moving the shifting lever 53, the manually operated valve 67, is also momentarily opened since the lower circular groove of this valve 67 (see Fig. 10) momentarily connects conduit 90 with conduit 92 in passing, which causes the application of pressure to the servomotor 93 and the momentary tightening of the brake band 94. This allows the rotation of the gears 45—57 to be slowed or stopped until the teeth 49 of the selector coupling silently and easily engages the teeth 96 of the forward drive gear 57 after which the brake band 94 is again immediately released due to release of pressure by reclosure of valve 67. The respective positions of the planetary gearing arrangement will then be as shown in Fig. 12 again with heavy lines indicating rotating gearing.

Figure 13:
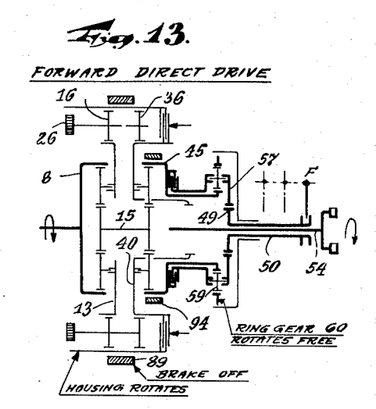

Now that the vehicle is in forward motion with accelerated motor speed, worm gear 62 rotates the worm 63 and shaft 64, causing the governor 66 to open valve 65 when the vehicle has attained a speed of about 18 to 20 miles per hour. Also upon acceleration of the motor, regulating valve 79 closes due to increased pressure exerted thereon, causing pressure to be built up in accumulators 76, 77 and 78. As the pressure increases upon closure of valve 79, the pumps are thus under an increased loading resulting in a slowing down in their speed of rotation, which decreases the rotation of intermediate gears 13—40, thereby causing output gear 45 to rotate at a higher speed. Upon opening of the governor controlled valve 65 fluid pressure is then applied to the servomotor 88 causing brake band 89 to release its normal engagement with the head 23. Accordingly the head 23 will now rotate about its bearings 24 and 25 and the centrifugal force due to its rotation will cause the valves 73, 74 and 75 to close communication from the pumps 26—29, 27—30 and 28—32 to the accumulators 76, 77 and 78 and to open communication from the latter through conduits 95 to the clutch plates 47 and force them into engagement with the plates 46 since the pressure stored in these accumulators 76, 77 and 78 is sufficient for this purpose and no further pressure at this time is being supplied to the accumulators by the fluid pressure pumps. Engagement of the clutch plates 46 and 47 thus "locks" the planetary gearing arrangements so that the input gear 8 and output drive gears 45—57 operate in unison at a one-to-one ratio after the vehicle has attained the 18 to 20 miles per hour speed with the gearing arrangement being as shown schematically in Fig. 13.

Figure 8:
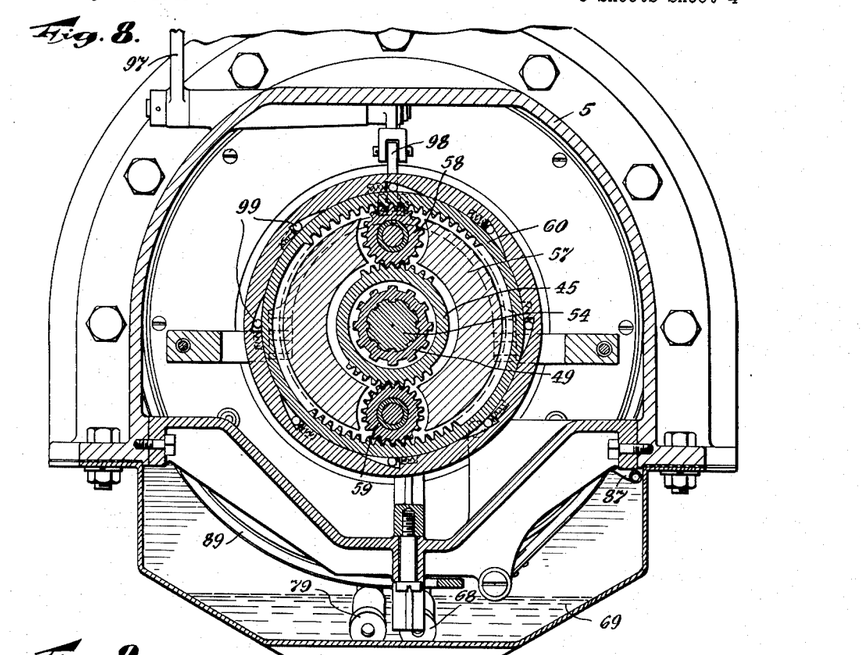
Fig. 8 is a sectional view taken on the line VIII—VIII of Fig. 1.
Figure 14:
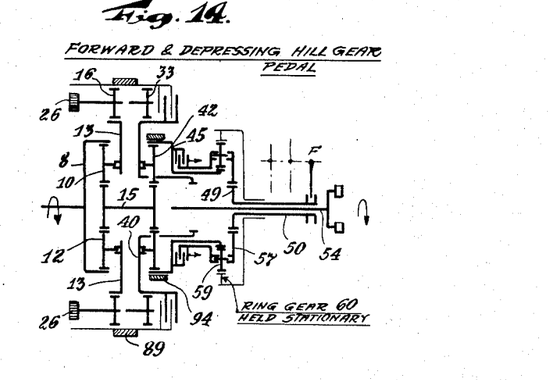

Assuming now that the vehicle motor starts to labor, as in climbing a hill, the operator moves a pivoted hill gear control lever 97 which, if desired, may be operated by complete depression of the accelerator pedal or as a separate lever. Movement of this pivoted lever causes disengagement of the clutch plates 55 and 56 through a clevis and link arrangement 98 which moves the latter to the right, as shown in Fig. 1, to exert more pressure on the customary clutch springs thereby relieving pressure on the clutch plates 55 and 56 as can be seen from Fig. 14. Also at this time, since the speed of the vehicle has been reduced, the governor controlled valve 65 will again have operated to cause the brake band 89 to grip head 23 and stop its rotation and clutch plates 45—46 will have disengaged due to release of pressure by reclosure of centrifugally operated valves 73, 74 and 75. The entire planetary arrangement will again operate as previously described with the exception that output gears 45—57 can no longer be considered as one. Instead gear 45 now rotates the pinion gears 58 and 59 which in turn roll around the inner periphery of ring gear 60 as the latter is held stationary by an over-riding brake which comprises a plurality of spring pressed rollers 99 (Fig. 8). Consequently output drive gear 57 is rotated at a much reduced speed but with greater power from the pinion gears 58 and 59 carried by the gear 57 resulting in this increased power being transmitted to the selector coupling 50 and the output drive shaft 54. Again the arrangement of the transmission in the forward and hill gear drive position may be readily appreciated by reference to the schematic showing as in Fig. 14.

Whenever it is desired to bring the vehicle to a stop the operator merely releases the accelerator and applies the brakes in the conventional manner. However, upon depression of the brake pedal (not shown), the pressure relief valve 83 (Fig. 10) opens since it is actuated by the brake fluid system, and when opened the pressure within the system, built up by the pump gears as the motor and transmission decelerate, is released by the fluid being discharged into the sump or reservoir 69. The shifting or direction lever 53 may then be returned to the neutral position although this is not essential if one intends to proceed in a forward direction, since the transmission will operate at motor idling speed without any torque being transferred to output gear 45.

Figure 15:
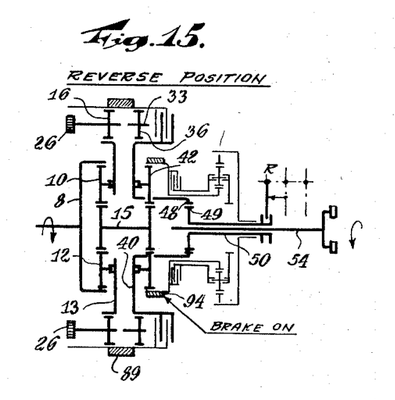

To cause reverse direction of movement of the vehicle the operator moves the shift lever 53 to the "reverse" position. This causes the manual selector coupling 50 to move to the left as shown in Fig. 1 with its gear teeth 49 engaging the teeth 48 carried by the extending hub portion of transfer gear 40. Thus the splined coupling 50, together with the output drive shaft 54 directly connected thereto, rotates at the speed of the transfer gear 40, with attendant rotation of the gears 45—57 having no part in the driving operation at this time since the brake band 94 holds output gear 45 and causing the torque to be transferred in reverse through gear 40 directly to coupling 50. The output drive shaft 54 accordingly rotates in a direction opposite to that when the coupling 50 is connected to the teeth on gear 57, causing reverse direction of movement of the vehicle. The entire arrangement of the gearing will at this time be as shown in the schematic diagram of Fig. 15.

It will thus be seen from the foregoing that an automatic transmission is herein shown and described which has a variable speed drive until the vehicle attains a speed of approximately 18 to 20 miles per hour at which time the transmission automatically shifts into a direct one-to-one ratio between the input and output drives. This variable speed is obtained through the utilization of hydraulic pressure which latter varies with the motor and transmission speeds until the predetermined speed of 18 to 20 miles is obtained at which time the transmission automatically shifts to the direct drive. Also a "hill gear" drive is provided which is automatically or manually thrown into operation whenever a greater power is needed by reducing the gearing ratio between the input and output drive gears to about 2.5 to 1.

In addition the transmission of the present invention includes a novel fluid pressure system wherein a plurality of pressure accumulators are utilized which store energy when the transmission is in variable speed drive that is subsequently expanded by the operation of centrifugal valves to automatically shift the gearing to direct one-to-one ratio at a fixed speed. Also during the variable speed drive the hydraulic pressure functions as a retarding influence on the intermediate gearing, with an increased hydraulic pressure reducing the speed of rotation of the intermediate gearing, and thereby causing a greater transfer of torque to the output drive gear. When high enough speed is obtained the increased hydraulic pressure operates to cause engagement of the direct drive clutch and at the same time pressurizes the accumulator for operation of the servo-motors. Another significant feature of the present invention resides in the fact that the transmission can be siliently shifted from forward to reverse drive without the necessity of bringing the vehicle to a complete stop.

Although one specific embodiment of the present invention has been shown and described it is to be understood that still further modifications thereof may be made without departing from the spirit and scope of the appended claims.

I claim:

1. An automatic variable speed transmission comprising a drive gear, a first intermediate variable torque transfer gear engageable with said drive gear for rotation by the latter and including a planetary gearing set engageable with an intermediate variable torque transfer equalizer gear, a head provided with a plurality of sets of pinion gears engaging said intermediate variable torque transfer gear for rotation thereby, a plurality of fluid pressure pumps carried by shafts driven by said sets of pinion gears, a plurality of pressure accumulators carried in the periphery of said head and connected to said fluid pressure pumps for accumulating fluid pressure therein upon rotation of said pumps below a definite speed of rotation of said drive gear, centrifugally operated valves for controlling fluid flow to and from said pressure accumulators, a second intermediate variable torque transfer gear including a planetary gearing set engageable with said sets of pinion gears and with said intermediate variable torque transfer equalizer gear and provided with clutch plates, a cooperating set of clutch plates carried by said head adjacent the clutch plates of said second intermediate variable torque transfer gear and operable by a release of pressure in said pressure accumulators in response to operation of said centrifugally operated valves to cause said sets of clutch plates to engage each other and cause rotation of said head, an output drive gear engaging the planetary gear set of said second intermediate variable torque transfer gear for rotating the latter, a forward drive output gear simultaneously rotatable with said output drive gear, an output shaft, and a manually operable selector coupling for connecting said output drive shaft to said forward output drive gear for rotation thereby during disengagement of the clutch plates carried by said head and the clutch plates carried by said second intermediate variable torque transfer gear, and for rotation of said output drive shaft by said intermediate variable torque transfer equalizer gear in a one-to-one ratio with said drive gear upon engagement of said cooperating clutch plates above a definite speed of rotation of said drive gear.

2. An automatic variable speed transmission comprising a drive gear, a first intermediate variable torque transfer gear engageable with said drive gear for rotation by the latter and including a planetary gearing set engageable with an intermediate variable torque transfer equalizer gear, a head provided with a plurality of sets of pinion gears engaging said intermediate variable torque transfer gear for rotation thereby, a plurality of fluid pressure pumps carried by shafts driven by said sets of pinion gears, a plurality of pressure accumulators carried in the periphery of said head and connected to said fluid pressure pumps for accumulating fluid pressure therein upon rotation of said pumps below a definite speed of rotation of said drive gear, centrifugally operated valves for controlling fluid flow to and from said pressure accumulators, a second intermediate variable torque transfer gear including a planetary gearing set engageable with said sets of pinion gears and with said intermediate variable torque transfer equalizer gear and provided with clutch plates, a cooperating set of clutch plates carried by said head adjacent the clutch plates of said second intermediate variable torque transfer gear and operable by a release of pressure in said pressure accumulators in response to operation of said centrifugally operated valves to cause said sets of clutch plates to engage each other and cause rotation of said head, an output drive gear engaging the planetary gear set of said second intermediate variable torque transfer gear for rotating the latter and provided with clutch plates, a forward drive output gear provided with clutch plates normally engaging the clutch plates of said output drive gear to cause simultaneous rotation of said output drive gear and said forward drive output gear, an output shaft, and a manually operable selector coupling for connecting said output drive shaft to said forward output drive gear.

3. An automatic variable speed transmission comprising a drive gear, a first intermediate variable torque transfer gear engageable with said drive gear for rotation by the latter and including a planetary gearing set engageable with an intermediate variable torque transfer equalizer gear, a head provided with a plurality of sets of pinion gears engaging said intermediate variable torque transfer gear for rotation thereby, a plurality of fluid pressure pumps carried by shafts driven by said sets of pinion gears, a plurality of pressure accumulators carried in the periphery of said head and connected to said fluid pressure pumps for accumulating fluid pressure therein upon rotation of said pumps below a definite speed of rotation of said drive gear, centrifugally operated valves for controlling fluid flow to and from said pressure accumulators, a second intermediate variable torque transfer gear including a planetary gearing set engageable with said sets of pinion gears and with said intermediate variable torque transfer equalizer gear and provided with clutch plates, a cooperating set of clutch plates carried by said head adjacent the clutch plates of said second intermediate variable torque transfer gear and operable by a release of pressure in said pressure accumulators in response to operation of said centrifugally operated valves to cause said sets of clutch plates to engage each other and cause rotation of said head, an output drive gear engaging the planetary gear set of said second intermediate variable torque transfer gear for rotating the latter and provided with clutch plates, a forward drive output gear provided with clutch plates normally engaging the clutch plates of said output drive gear to cause simultaneous rotation of said output drive gear and said forward drive output gear, pinion gears carried by said forward drive output gear and engaging a ring gear and rotatable as a unit during engagement of the clutch plates carried by said output drive gear and the clutch plates carried by said forward drive output gear, an output shaft, and a manually operable selector coupling for connecting said output drive shaft to said forward output drive gear.

4. An automatic variable speed transmission comprising a drive gear, a first intermediate variable torque transfer gear engageable with said drive gear for rotation by the latter and including a planetary gearing set engageable with an intermediate variable torque transfer equalizer gear, a head provided with a plurality of sets of pinion gears engaging said intermediate variable torque transfer gear for rotation thereby, a plurality of fluid pressure pumps carried by shafts driven by said sets of pinion gears, a plurality of pressure accumulators carried in the periphery of said head and connected to said fluid pressure pumps for accumulating fluid pressure therein upon rotation of said pumps below a definite speed of rotation of said drive gear, centrifugally operated valves for controlling fluid flow to and from said pressure accumulators, a second intermediate variable torque transfer gear including a planetary gearing set engageable with said sets of pinion gears and with said intermediate variable torque transfer equalizer gear and provided with clutch plates, a cooperating set of clutch plates carried by said head adjacent the clutch plates of said second intermediate variable torque transfer gear and operable by a release of pressure in said pressure accumulators in response to operation of said centrifugally operated valves to cause said sets of clutch plates to engage each other and cause rotation of said head, an output drive gear engaging the planetary gear set of said second intermediate variable torque transfer gear for rotating the latter and provided with clutch plates, a forward drive output gear provided with clutch plates normally engaging the clutch plates of said output drive gear to cause simultaneous rotation of said output drive gear and said forward drive output gear, pinion gears carried by said forward drive output gear and engaging a ring gear and all rotatable as a unit with said output drive gear during engagement of the clutch plates carried by said output drive gear and the clutch plates carried by said forward drive output gear, an output shaft, a manually operable selector coupling for connecting said output drive shaft to said forward drive output gear, and a hill gear control mechanism operable when desired to cause disengagement of said normally engaged clutch plates and the separate simultaneous rotation of said forward drive output gear with its self supported pinion gears and said ring gear, to increase the power ratio applied to said output drive shaft.

5. An automatic variable speed transmission comprising a drive gear, a first intermediate variable torque transfer gear engageable with said drive gear for rotation by the latter and including a planetary gearing set engageable with an intermediate variable torque transfer equalizer gear, a head provided with a plurality of sets of pinion gears engaging said intermediate variable torque transfer gear for rotation thereby, a plurality of fluid pressure pumps carried by shafts driven by said sets of pinion gears, a plurality of pressure accumulators carried in the periphery of said head and connected to said fluid pressure pumps for accumulating fluid pressure therein upon rotation of said pumps below a definite speed of rotation of said drive gear, centrifugally operated valves for controlling fluid flow to and from said pressure accumulators, a second intermediate variable torque transfer gear including a planetary gearing set engageable with said sets of pinion gears and with said intermediate variable torque transfer equalizer gear and provided with clutch plates, a cooperating set of clutch plates carried by said head adjacent the clutch plates of said second intermediate variable torque transfer gear and operable by a release of pressure in said pressure accumulators in response to operation of said centrifugally operated valves to cause said sets of clutch plates to engage each other and cause rotation of said head, an output drive gear engaging the planetary gear set of said second intermediate variable torque transfer gear for rotating the latter and provided with clutch plates, a forward drive output gear provided with clutch plates normally engaging the clutch plates of said output drive gear to cause simultaneous rotation of said output drive gear and said forward drive output gear, an output shaft, and a manually operable selector coupling operable at will for connecting said output drive shaft to said forward output drive gear to cause movement of said output drive shaft in one direction of rotation or for connecting said second intermediate variable torque transfer gear to said output drive shaft with by-passing of said forward drive output gear to cause a reverse direction of rotation of said output drive shaft.

6. An automatic variable speed transmission comprising a drive gear, a first intermediate variable torque transfer gear engageable with said drive gear for rotation by the latter and including a planetary gearing set engageable with an intermediate variable torque transfer equalizer gear, a head provided with a brake band normally in engagement therewith and having a plurality of sets of pinion gears engaging said intermediate variable torque transfer gear for rotation thereby, a plurality of fluid pressure pumps carried by shafts driven by said sets of opinion gears, a plurality of pressure accumulators carried in the periphery of said head and connected to said fluid pressure pumps for accumulating fluid pressure therein upon rotation of said pumps below a definite speed of rotation of said drive gear, centrifugally operated valves for controlling fluid flow to and from said pressure accumulators, a second intermediate variable torque transfer gear including a planetary gearing set engageable with said sets of pinion gears and with said intermediate variable torque transfer equalizer gear and provided with clutch plates, a cooperating set of clutch plates carried by said head adjacent the clutch plates of said second intermediate variable torque transfer gear and operable by a release of pressure in said pressure accumulators in response to operation of said centrifugally operated valves to cause said sets of clutch plates to engage each other and cause rotation of said head, an output drive gear engaging the planetary gear set of said second intermediate variable torque transfer gear for rotating the latter and provided with clutch plates and an adjacent normally disengaged brake band, a forward drive output gear provided with clutch plates normally engaging the clutch plates of said output drive gear to cause simultaneous rotation of said output drive gear and said forward drive output gear, an output shaft, a manually operable selector coupling for connecting said output drive shaft to said forward output drive gear or to said second intermediate variable torque transfer gear for reverse direction of rotation of said output drive shaft, a servo-motor connected to the brake band normally engaging said head, a second servo-motor connected to the brake band disposed adjacent said output drive gear, a governor controlled valve connected to said output drive shaft and operable to cause the application of a fluid pressure to said first mentioned servo-motor and release of the normally engaged brake band from said head to condition the latter for rotation upon building up of pressure in said accumulators, and a valve connected to the manually operable selector coupling control and operable to cause the momentary operation of said second mentioned servo-motor with attendant momentary engagement of the adjacent brake band with said output drive gear to retard rotation of the latter and facilitate engagement of the manually operable selector coupling with either the second intermediate variable torque transfer gear or said forward drive output gear as selected.

7. An automatic variable speed transmission comprising a drive gear, a first intermediate variable torque transfer gear engageable with said drive gear for rotation by the latter and including a planetary gearing set engageable with an intermediate variable torque transfer equalizer gear, a head provided with a plurality of sets of pinion gears engaging said intermediate variable torque transfer gear for rotation thereby, a plurality of fluid pressure pumps carried by shafts driven by said sets of pinion gears, a plurality of pressure accumulators carried in the periphery of said head and connected to said fluid pressure pumps for accumulating fluid pressure therein upon rotation of said pumps below a definite speed of rotation of said drive gear, centrifugally operated valves for controlling fluid flow to and from said pressure accumulators, a second intermediate variable torque transfer gear including a planetary gearing set engageable with said sets of pinion gears and with said intermediate variable torque transfer equalizer gear and provided with clutch plates, a cooperating set of clutch plates carried by said head adjacent the clutch plates of said second intermediate variable torque transfer gear and operable by a release of pressure in said pressure accumulators in response to operation of said centrifugally operated valves to cause said sets of clutch plates to engage each other and cause rotation of said head, an output drive gear engaging the planetary gear set of said second intermediate variable torque transfer gear for rotating the latter and provided with clutch plates, a forward drive output gear provided with clutch plates normally engaging the clutch plates of said output drive gear to cause simultaneous rotation of said output drive gear and said forward drive output gear, an output shaft, a manually operable selector coupling for connecting said output drive shaft to said forward output drive gear, and a hydraulic pressure system including said pinion gear pumps, said accumulators, a governor controlled valve, a pressure accumulator chamber, a pressure relief valve operated by a vehicle braking system, and a pair of servo-motors.

JOSEPH WILLIAM ELLOR.

REFERENCES CITED

The following references are of record in the file of this patent:

UNITED STATES PATENTS

| Number | Name | Date |
| --- | --- | --- |
| 2,126,662 | Ramsey | Aug. 9, 1938 |
| 2,154,710 | Thoma | Apr. 18, 1939 |
| 2,181,647 | Wheaton | Nov. 28, 1939 |
| 2,188,233 | Ramsey | Jan. 23, 1940 |
| 2,330,375 | Orner | Sept. 28, 1943 |